(12) United States Patent
Kameyama

(10) Patent No.: US 7,952,622 B2
(45) Date of Patent: May 31, 2011

(54) IMAGING APPARATUS AND IMAGING METHOD

(75) Inventor: Takashi Kameyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 474 days.

(21) Appl. No.: 12/099,298

(22) Filed: Apr. 8, 2008

(65) Prior Publication Data

US 2008/0252755 A1 Oct. 16, 2008

(30) Foreign Application Priority Data

Apr. 10, 2007 (JP) ................. P2007-103241

(51) Int. Cl.
*H04N 5/202* (2006.01)
(52) U.S. Cl. ...................................... 348/254
(58) Field of Classification Search ............... 348/222.1, 348/254, E5.031, 241
See application file for complete search history.

(56) References Cited

U.S. PATENT DOCUMENTS

| 2005/0046701 A1* | 3/2005 | Kaneko et al. | 348/222.1 |
| 2005/0162529 A1* | 7/2005 | Nakasuji et al. | 348/222.1 |

FOREIGN PATENT DOCUMENTS

JP 2005 39710 2/2005

* cited by examiner

*Primary Examiner* — David L Ometz
*Assistant Examiner* — Akshay Trehan
(74) *Attorney, Agent, or Firm* — Frommer Lawrence & Haug LLP; William S. Frommer; Thomas F. Presson

(57) ABSTRACT

An imaging method is provided. The imaging method includes the steps of: carrying out a nonlinear correction on an imaging signal obtained from an image sensor where imaging light is converted into an imaging signal; adding a predetermined number of frames of the imaging signal with the nonlinear correction per frame; carrying out control for appropriately setting each of the correction characteristic of the nonlinear correction in the case of carrying out no frame addition and the correction characteristic of the nonlinear correction in the case of carrying out a frame addition; and selectively outputting either the imaging signal with the frame addition or the imaging signal without the frame addition.

6 Claims, 5 Drawing Sheets

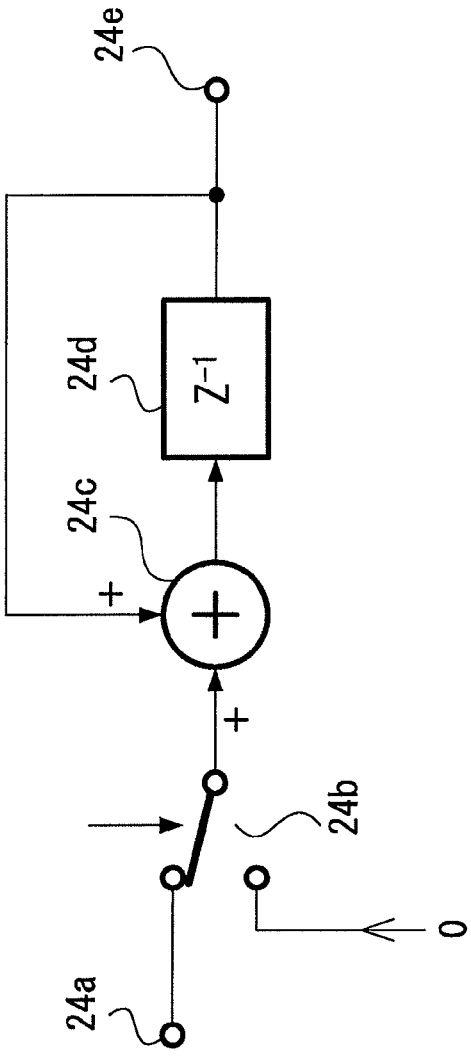
FIG. 2
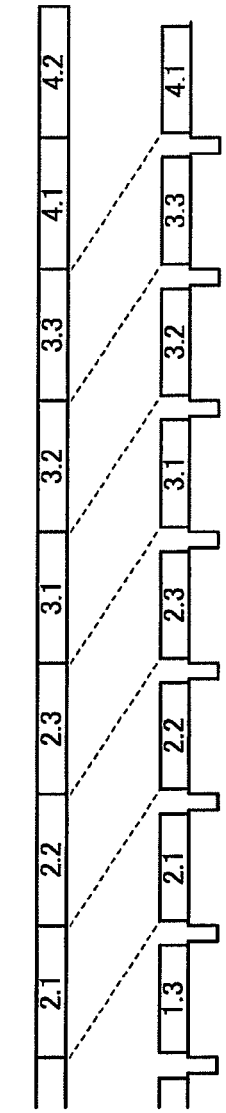
FIG. 3A  IMAGING FRAME
FIG. 3B  EXPOSURE PERIOD
FIG. 3C  SENSOR OUTPUT
FIG. 3D  ADDITION OUTPUT

IMAGING APPARATUS AND IMAGING METHOD

CROSS REFERENCE TO RELATED APPLICATIONS

The present invention contains subject matter related to Japanese Patent Application 2007-103241 filed in the Japanese Patent Office on Apr. 10, 2007, the entire contents of which being incorporated herein by reference.

BACKGROUND OF THE INVENTION

1. Field of the Invention

The invention relates to an imaging apparatus that is applied to a video camera capable of imaging at a low frame rate and to an imaging method that is applied to the imaging apparatus.

2. Description of the Related Art

A video camera, which obtains video signals conforming to a television broadcasting format or the like, employs a specified frame rate of $\frac{1}{60}$ second, $\frac{1}{50}$ second, or the like for capturing an image with an imager. For example, a video camera with a frame rate of $\frac{1}{60}$ second has the maximum period (or shutter period) of $\frac{1}{60}$ second for accumulating imaging light received with an imager for each frame.

When processing of shortening a period of receiving imaging light within one frame period (or electronic shutter processing) is carried out, an image can be captured at a high shutter speed such as $\frac{1}{100}$ second, $\frac{1}{1000}$ second, or the like. In this case, however, allowing a period of receiving imaging light to be longer than one frame period (or a low shutter speed) may not be carried out.

For realizing a shutter speed of lower than $\frac{1}{60}$ second, imaging light for a long period over a plurality of frame periods can be received by an imager and then a signal corresponding to the imaging light is read out of the imager. For example, when a CCD (charge coupled device) image sensor is used as an imager, a period at which charges are accumulated in each pixel by receiving light can be extended. For example, when the electron-accumulation period for each pixel corresponds to the sum of two frame periods ($\frac{1}{30}$ second), a signal accumulated within $\frac{1}{30}$ second can be read out. Thus, low-rate imaging with twice the accumulation period can be attained. The imaging signal thus obtained may be intermittently changed every $\frac{1}{30}$ second that is twice the general frame period. Since the charge accumulation period is extended, imaging with high sensitivity can be attained as much. For example, an image can be captured even in darkness such as at night. In addition to the above-described exemplified processing of accumulating charges for twice the frame period, the period of accumulating electrons in the imager may be adjusted, for example, to allow the imaging to be extended for a period of several tens of frames.

Japanese Unexamined Patent Application Publication No. 2005-39710 discloses an example of an imaging apparatus that carries out processing of varying frame rates by frame addition.

SUMMARY OF THE INVENTION

However, if the period of electron accumulation in a light-receiving element of the image sensor is extended as described above, a dynamic range of the correcting function of the image sensor is caused to be insufficient. Thus, the resulting image may expose a fixed pattern noise of the image sensor, or an automatic control system such as a white balance adjustment will be not enough for practical use due to intermittent images. As a result, degradation in image quality may occur extensively.

For example, the output from the image sensor may be subjected to digital synchronized addition at the stage in which an imaging signal output from the image sensor is a linear signal. Here, the phrase "the stage in which an imaging signal output from the image sensor is a linear signal" means the stage of a signal on which the output of the image sensor before subjecting to various kinds of imaging-signal processing, such as white-balance adjustment and gamma correction, is directly reflected.

In order to add the output of the image sensor without any modification, a frame memory for directly adding the output of the image sensor may be required. However, an imaging signal output from the image sensor is a signal before compressing the word length in the amplitude direction by nonlinear processing and gain control at a gamma circuit, a knee circuit, or the like. Therefore, an expensive memory system having a large word length may be required.

In the case of adding signal of respective frames after carrying out nonlinear conversion, such as gamma correction, the simple addition may cause the misalignment of nonlinear-processing parameters for the respective frames. Thus, there is a high possibility of causing a degraded video signal.

The processing described in Japanese Unexamined Patent Application Publication No. 2005-39710 is configured such that signals of respective frames are added after subjecting to nonlinear conversion, such as gamma correction. However, there is no description regarding degradation in characteristics when the addition is carried out after gamma correction.

The invention addresses the above-identified, and other problems associated with conventional methods and apparatuses. It is desirable to provide an imaging apparatus with which imaging at a low frame rate with high image quality can be carried out with a simplified configuration of the imaging apparatus.

According to an embodiment of the invention, there is provided an imaging apparatus and according to another embodiment of the invention, there is provided an imaging method. An imaging signal obtained from an image sensor for converting imaging light into the imaging signal is subjected to nonlinear correction. A predetermined number of frames of the imaging signal subjected to the nonlinear correction are added per frame. The control of the correction characteristics of the nonlinear correction is carried out to suitably define the correction characteristic thereof when the frame addition is carried out and the correction characteristic thereof when the frame addition is not carried out. After carrying out the nonlinear correction under such controls, the imaging signal with the frame addition or the imaging signal without the frame addition is selectively output or recorded.

With the processing as described above, an imaging signal subjected to appropriate nonlinear correction, such as the gamma correction, can be obtained in the case where the frame addition is carried out and in the case where the frame addition is not carried out.

According to the above embodiments of the invention, the characteristics of the nonlinear correction, such as gamma correction, of an imaging signal can be suitably controlled in each of the case in that frame addition is carried out and the case in that frame addition is not carried out. Therefore, an imaging signal at a low frame rate with a high image quality, which has been subjected to gamma correction or the like, can be obtained with a simplified configuration of an imaging apparatus, for example, by adding a small number of circuits and control processing systems to the related-art imaging apparatus.

BRIEF DESCRIPTION OF THE DRAWINGS

FIG. 2 is a circuit diagram illustrating an example of synchronized addition in an imaging apparatus in accordance with the embodiment of the invention.

FIGS. 3A to 3D are timing charts illustrating an example of imaging timing (three-frame addition) in an imaging apparatus in accordance with the embodiment of the invention.

FIG. 4A represents an ideal processing example and FIG. 4B represents a processing example of the embodiment.

FIG. 5A shows the whole characteristic and FIG. 5B shows an enlarged view of the part of the characteristic diagram shown in FIG. 5A.

DESCRIPTION OF THE PREFERRED EMBODIMENTS

Hereinafter, examples of one embodiment of the invention will be described with reference to FIGS. 1 to 6.

Figure 1:
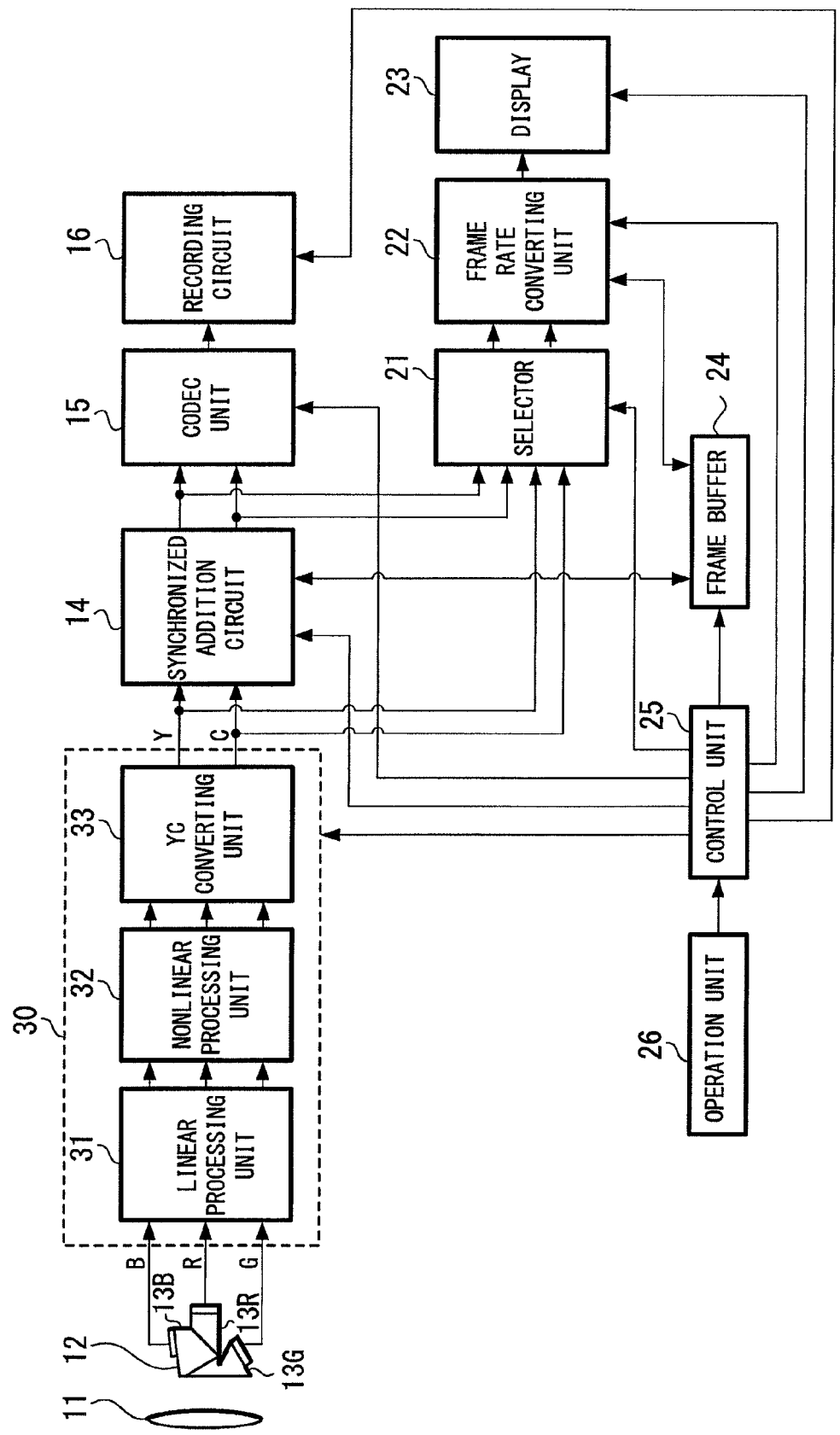
FIG. 1 is a block diagram illustrating an example of configuration of an imaging apparatus in accordance with an embodiment of the invention.

FIG. 1 is a block diagram illustrating an exemplified configuration of an imaging apparatus as an example of the embodiment of the invention. Referring now to FIG. 1, the configuration of the imaging apparatus will be described. Imaging light obtained through a lens 11 is separated into three primary colors by a prism 12. The separated imaging light rays of the respective colors are incident on the imaging surfaces of blue, green, and red image sensors 13B, 13G, and 13R, respectively. The imaging light rays forming images on the imaging surfaces of the respective color image sensors 13B, 13G, and 13R are converted into electric signals in the respective image sensors 13B, 13G, and 13R, followed by reading out converted electric signals, respectively. The electric signals read out of the image sensors 13B, 13G, and 13R are referred to as imaging signals, respectively.

For simplifying the description, the lens 11 is represented as a single lens in FIG. 1. In actual, however, the lens 11 may include a plurality of lenses (lens groups) and may act as a zoom lens. In addition, but not shown in the figure, an iris, an aperture mechanism, is also arranged in the optical path of the lens 11. The image sensors 13B, 13G, and 13R may be, for example, CCD image sensors or CMOS image sensors.

The imaging signals read out of the image sensors 13B, 13G, and 13R are supplied to a camera processing unit 30. Subsequently, the imaging signals are subjected to various kinds of correction processing in the camera processing unit 30. The correction procedures include correction with linear-signal processing and nonlinear-signal processing.

The imaging signals input in the camera processing unit 30 are first supplied to a linear processing unit 31 and then subjected to linear signal processing. The linear signal processing may be, for example, the processing of correcting a white balance adjustment in which the balance of blue, green, and red imaging signals is adjusted. The imaging signal processed by the linear processing unit 31 is supplied to a nonlinear processing unit 32, thereby subjecting to nonlinear signal processing.

The correction with the nonlinear signal processing in the nonlinear processing unit 32 may be a gamma (v) correction, knee correction, or the like. The gamma correction is correction processing of representing a luminance value of each color using nonlinear I/O characteristics on the basis of a gamma correction curve. The knee correction is nonlinear-correction processing in the nonlinear processing unit 32 to adjust the brightness of a bright portion in an image. The nonlinear-correction processing in the nonlinear processing unit 32 is configured as follows. The nonlinear-correction processing when carrying out normal imaging and the nonlinear-correction processing when carrying out frame addition as described below can be defined with different correction characteristics by instructions supplied from the later-described control unit 25, respectively. Furthermore, the correction characteristics may be defined with further correction depending on the number of frames added at the time of the frame addition.

The imaging signal corrected in the nonlinear processing unit 32 is supplied to an YC converting unit 33. Here, the YC converting unit 33 converts the imaging signal formed of blue, green, and red primary color signals (hereinafter, referred to as RGB signals) into imaging signals including a luminance signal (hereinafter, referred to as an Y signal) and a chroma signal (hereinafter, referred to as a C signal). The imaging signal converted by the YC converting unit 33 is output from the camera processing unit 30.

The imaging signals (Y signal and C signal) output from the camera processing unit 30 are supplied to a synchronized addition circuit 14. In addition, the synchronized addition circuit 14 is connected to a frame buffer 24 formed of a frame memory. Imaging signal supplied is subjected to addition per frame when the imaging is carried out at a low frame rate. The number of frames added and so on may be controlled by the control unit 25. The imaging signal added in the synchronized addition circuit 14 and the imaging signal without addition are supplied to a codec unit 15.

The codec unit 15 performs codec processing in which imaging signals supplied are converted into a video signal of a predetermined format. Then, the converted video signal is supplied to a recording circuit 16 and then recorded in a recording medium (storage medium). The recording medium suitably used may be any of various media, such as memory cards, optical disks, and magnetic tapes.

Furthermore, an imaging signal output from the camera processing unit 30 and an imaging signal output from the synchronized addition circuit 14 are supplied to a selector 21. Thus, under the control of the control unit 25, the imaging signal to be displayed is selected by the selector 21. For example, the selector 21 selects the imaging signal output from the synchronized addition circuit 14 when displaying video of the imaging signal obtained at a low frame rate at the time of low-frame rate imaging. On the other hand, the selector 21 selects the output from the camera processing unit 30 when the imaging signal being not added per frame during the low-frame rate imaging is displayed. At the time of normal imaging, there is no difference in the selected imaging signals.

The imaging signal selected by the selector 21 is subjected to the conversion of frame rate for display or external output by the frame rate converting unit 22, followed by being displayed on the display 23. Alternatively, a video signal converted by the frame rate converting unit 22 may be output from an output terminal (not shown). The conversion in the frame rate converting unit 22 and the display in the display 23 are also carried out under control of the control unit 25. When the conversion of frame rate is carried out in the frame rate converting unit 22, the conversion processing is performed using a frame buffer 24 as a temporary storage device.

The control unit 25, which controls the respective units of the imaging apparatus, receives operation instructions from an operation unit 26 having operation switches and so on. Thus, the operation of the operation unit 26 leads to the control of imaging actions, such as the start or termination of imaging. In addition, the setting of an imaging mode and so on can be performed on the basis of the operation of the operation unit 26. The control unit 24 also controls the action of accumulating imaging signals in the frame buffer 24. Here, the frame buffer 24 is a memory in which an image signal can be stored in the form of a Y signal and a C signal.

Referring now to FIG. 2, the configuration of the synchronized addition circuit will be described when the frame buffer 24 is used as a memory circuit for synchronized addition. An imaging signal input into an input terminal 24a is supplied to an adder 24c through a switching switch 24b. Here, the switching switch 24b selects a terminal where 0 (zero) data is obtained but not the opposite side, the input terminal 24a, during the period without addition of imaging signals. The adder 24c is provided for the addition of outputs from a memory unit 24d. Then, the output of the adder 24c is supplied to and stored in the memory unit 24d. Subsequently, the imaging signal stored in the memory unit 24d is output from an output terminal 24e. In the configuration of the circuit illustrated in FIG. 2, the processing in which the memory unit 24d stores an imaging signal of one frame and the imaging signal stored is added to an input signal in the adder 24c is synchronously carried out on each frame. Thus, a signal for each frame can be added in order. Subsequently, the imaging signal to which a required number of frames are added is output from the output terminal 24e. For carrying out the addition in the frame buffer 24, the position of pixel added in each frame is adjusted so as to be coincident with the pixel other. Thus, such an addition makes the luminance value of each pixel position into the value added in the period corresponding to the number of added frames.

FIGS. 3A to 3D are timing charts illustrating an imaging operation when addition processing is carried out in the synchronized addition circuit 14 of the imaging apparatus of this example. The example shown in FIGS. 3A to 3D is one in which three frames of imaging signal are added. FIG. 3A illustrates the frame cycle of imaging signal. As shown in FIGS. 3B to 3D, imaging signals of three frames during the exposure are added and provided as a signal of one frame. Specifically, as shown in FIG. 3D, outputs from the image sensor during three frame periods with exposure periods 1.1, 1.2, and 1.3 are added together, resulting in an imaging signal of frame number 1 subjected to the three-frame addition in the synchronized addition circuit 14. The imaging signal of frame number 1 is output from the synchronized addition circuit 14 during successive three frame periods. Outputs from the image sensor during three frame periods with the subsequent exposure periods 2.1, 2.2, and 2.3 are added together, resulting in an imaging signal of frame number 2 subjected to the three-frame addition in the synchronized addition circuit 14. The imaging signal of frame number 2 is also output from the synchronized addition circuit 14 during successive three frame periods.

Accordingly, the imaging signal obtained from the addition of three frames leads to the exposure time in the image sensor 13B, 13G, or 13R three times longer than that of the image signal at the time of normal imaging. Thus, the frame rate of the imaging is one-third of the normal imaging, thereby resulting in favorable imaging even in darkness. In this case, the cycle of image variation is also lowered to one-third of the normal one. The example illustrated in FIG. 3 has been described as an example of the three frame addition. However, optionally, the number of frames added may be two or more. For example, if one frame is 1/60 second and 60-frame addition is carried out, imaging can be carried out at a low frame rate of every one second.

Figure 4A:
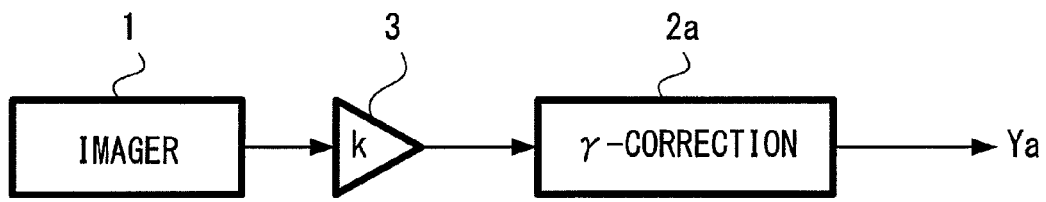
FIGS. 4A and 4B are timing charts illustrating the outline of processing in an imaging apparatus in accordance with the embodiment of the invention, where
Figure 4B:
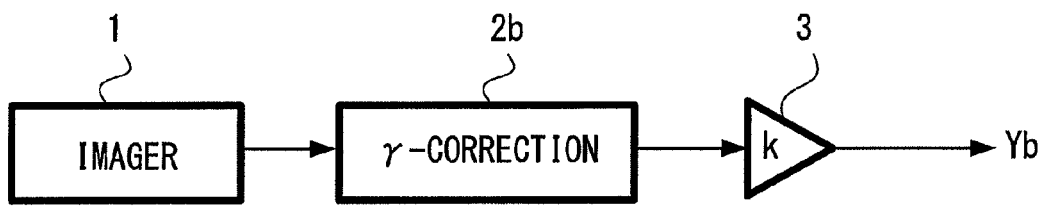

Referring now to FIGS. 4A and 4B and the subsequent drawings, the gamma correction processing carried out in the imaging apparatus of this example will be described. FIG. 4A is a block diagram illustrating the state of ideal gamma correction in low-frame-rate mode. FIG. 4B is a block diagram illustrating the state of gamma correction in low-frame-rate mode in the present example.

First, the typical gamma correction state in low-frame-rate mode (i.e., at the time of imaging with frame addition) is illustrated in FIG. 4A. An output imaging signal from an imager 1 is subjected to "k"-frame addition ("k" is the number of frames added) in an adding circuit 3. The output of the addition is subjected to nonlinear correction in a gamma correction circuit 2a. If the output cycle of the imager 1 is directly set at a low frame rate, the adding circuit 3 may be included in the imager 1. The correction carried out in the gamma correction circuit 2a can lead to an imaging signal Ya being suitably gamma-corrected.

In contrast, in the state of gamma correction in low-frame-rate mode in the present example, as shown in FIG. 4B, the output imaging signal from the imager 1 is subjected to gamma correction in the gamma correction circuit 2b with characteristics suitable for imaging in low-frame-rate mode, thereby obtaining a gamma-corrected imaging signal Zb. The gamma-corrected imaging signal Zb is then subjected to "k"-frame addition in the adding circuit 3 ("k" is the number of frames added), thereby obtaining an imaging signal Yb. The gamma correction circuit 2b corresponds to the nonlinear processing unit 32 in the configuration of the imaging apparatus shown in FIG. 1.

Figure 5A:
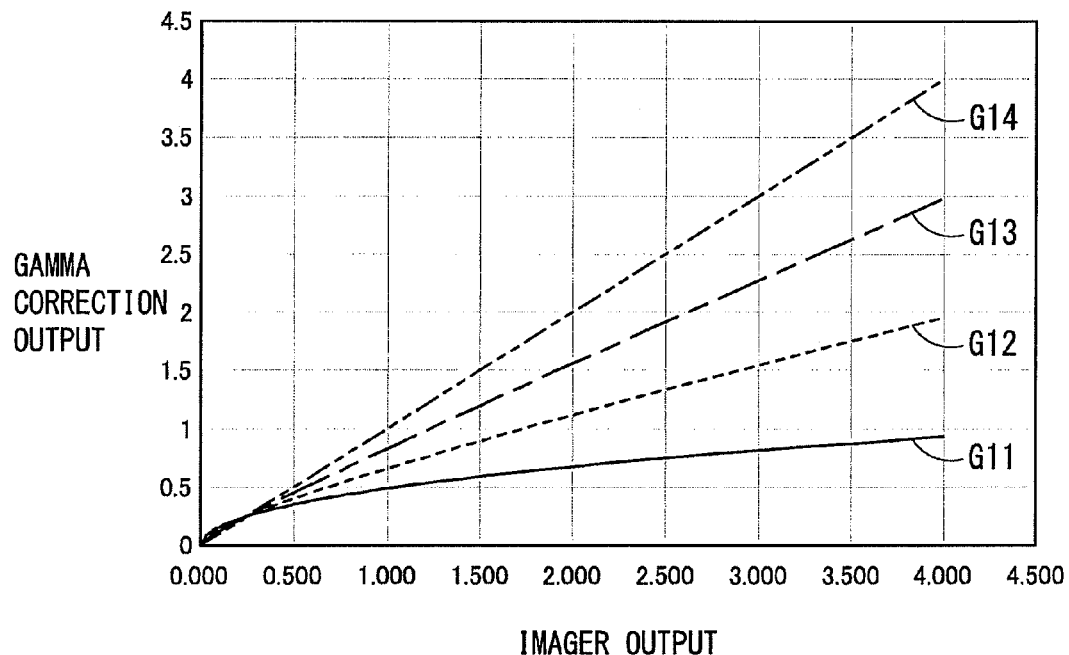
FIGS. 5A and 5B are characteristic diagrams illustrating an example of gamma characteristic when four-frame addition is carried out in an imaging apparatus in accordance with the embodiment of the invention, where
Figure 5B:
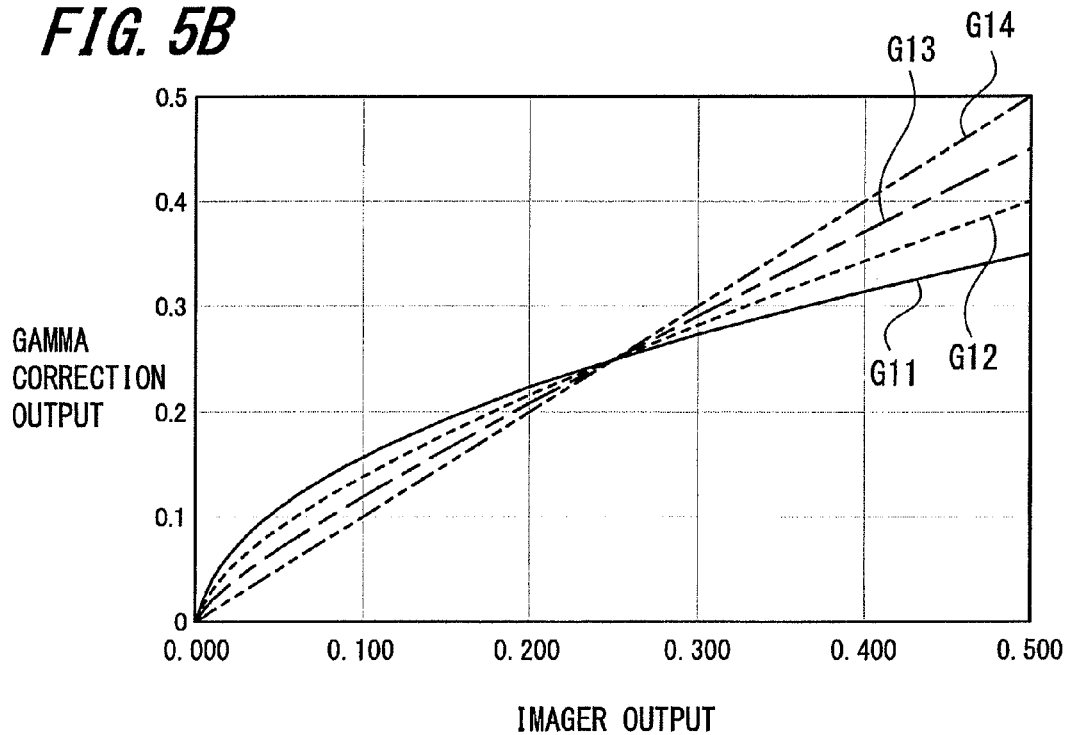

Next, the actual gamma characteristic will be described with reference to the characteristic charts shown in FIGS. 5A and 5B. The gamma characteristic G11 of FIG. 5A illustrates the optimal gamma characteristic of the imaging signal at the time of imaging at a low frame rate of 4-frame addition. In FIGS. 5A and 5B, the horizontal axis represents the respective color luminance levels of an imaging signal output from the image sensor and the vertical axis represents output examples after gamma correction. In FIG. 5A, if the gamma-gain of the characteristic G11 is defined as 1 (one), the gamma characteristic G12, G13, and G14 are the respective characteristics of the examples with the gamma gains restricted to 2/3, 1/3, and 0. In the case of characteristic G14 in which gamma correction is not carried out at all, the conversion characteristic is represented by a straight line. The characteristic representation can be curved as it becomes appropriate gamma characteristic G11.

FIG. 5B is an enlarged view of the proximity of a rising portion in the characteristic curve of FIG. 5A. As shown in FIG. 5B, the characteristic G11 intersects with other characteristics G12, G13, and G14 at one point. The gamma characteristic shown in FIGS. 5A and 5B is one defined by the SMPTE standard.

It should be noted that FIGS. 5A and 5B illustrate an example of 4-frame addition. The correction characteristic may vary depending on the number of frames added.

Here, as illustrated in FIG. 4A, the gamma correction in the gamma correction circuit 2a is, for example, carried out after the frame addition. The imaging signal Ya is obtained by carrying out appropriate gamma correction on a signal subjected to the frame addition. The configuration of the present example shown in FIG. 4B is allowed to obtain a signal Zb corrected by the gamma correction circuit 2b (nonlinear processing unit 32) before the frame addition. The gamma-corrected imaging signal Yb is finally obtained. In this case, Ya=Yb. Thus, the signal Zb can be represented by the following equations in which K represents the number of frames added, Gamma 1 represents the transfer characteristic of the gamma correction circuit 2a, and Gamma 2 represents the transfer characteristic of the gamma correction circuit 2b.

$$Zb = \text{Gamma2}(X) \quad (1)$$

on the other hand, the signal Ya is represented by the following equation:

$$Ya = \text{Gamma1}(KX) \quad (2)$$

Ya=Yb, thus $$Zb = (1/K)Yb = (1/K)\cdot\text{Gamma1}(KX) \quad (3)$$

Therefore, from the equations (1) and (3), the correct gamma correction can be carried out by setting the transfer characteristic of the gamma correction circuit 2b as the following equation:

$$\text{Gamma2}(X) = (1/K)\cdot\text{Gamma1}(KX) \quad (4)$$

The equation (4) indicates that the gamma curve of gamma correction in the gamma correction circuit 2b (i.e., nonlinear processing unit 32) at the time of imaging at a low frame rate can be obtained by changing the scale of gamma curve at the time of normal imaging. In other words, it can be obtained with a scaling of extending or reducing the amplitude transfer characteristic in the axis directions, so that imaging apparatus can simply cope with each of the normal imaging and the imaging at a low frame rate.

Figure 6:
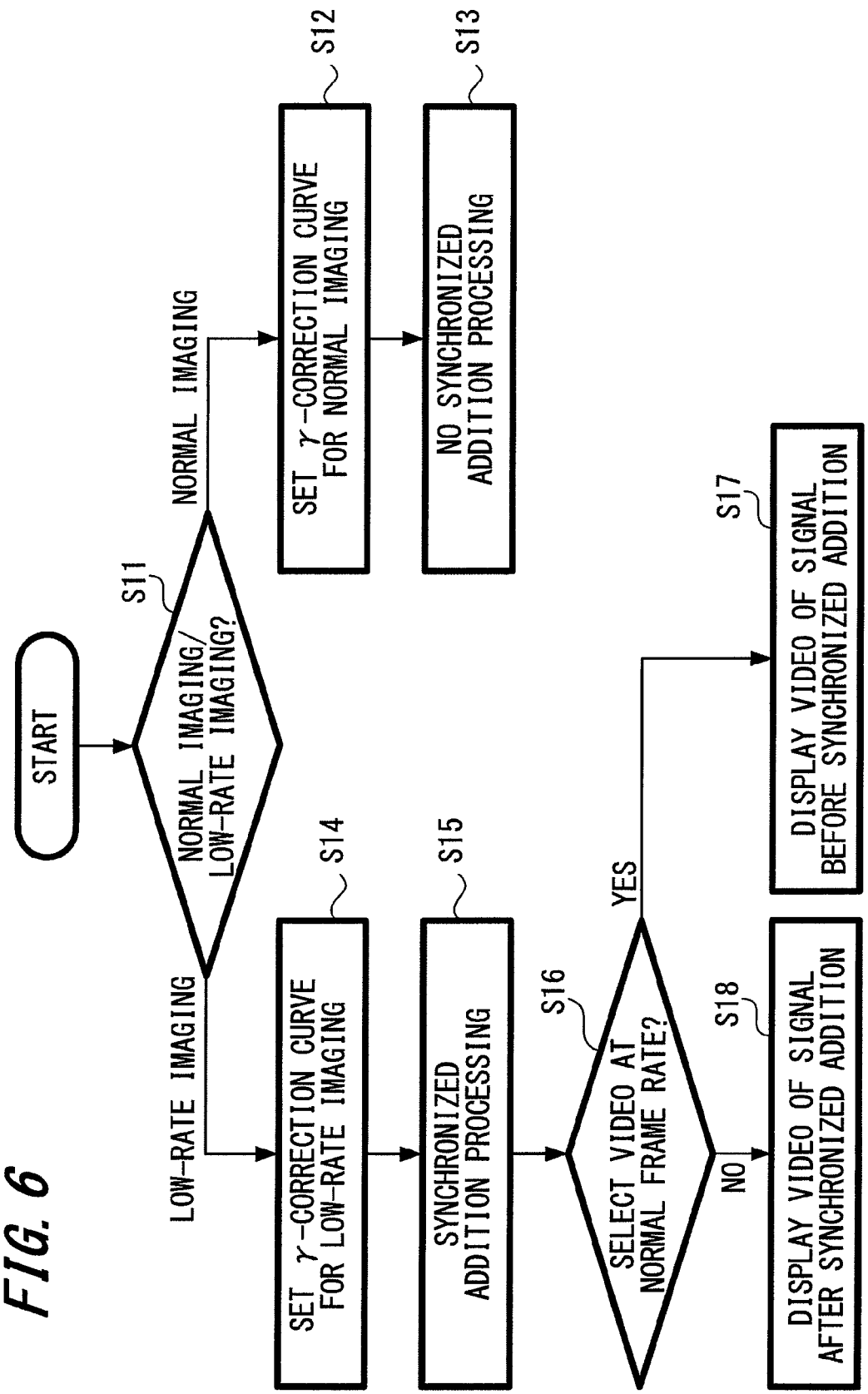
FIG. 6 is a flowchart illustrating an example of processing in an imaging apparatus in accordance with the embodiment of the invention.

Furthermore, FIG. 6 is a flowchart that describes a process example at the time of imaging at a low frame rate carried out by the control operation of the control unit 25. First, the control unit 25 determines whether the present imaging mode is imaging at a normal frame rate or imaging at a low frame rate (Step S11). Here, at the time of imaging at a normal frame rate, the nonlinear processing unit 32 defines a gamma correction curve for normal imaging (Step S12), and recording, display, or the like is carried out while no addition processing is carried out in the synchronized addition circuit 14 (Step S13).

In contrast, at the time of imaging at a low frame rate, the nonlinear processing unit 32 defines a gamma correction curve for low-frame-rate imaging (Step S14) and an imaging signal is then obtained after the addition corresponding to the number of frames added (K) (Step S15).

For displaying video on the display 23, either video at a normal frame rate or video at a low-frame-rate processed by frame addition is selected (Step S16). If the video at the normal frame rate is selected, the selector 21 selects the output of the camera processing unit 30 and video based on the selected imaging signal is then displayed on the display 23 (Step S17). When the video at the normal frame rate is desired to be displayed, the video is one being varied with a normal frame rate (i.e., 1/60 second or the like). Thus, the actual imaging state is found and the focus adjustment of a lens, the adjustment of field angle of a zoom lens, and so on can be quickly and correctly carried out. However, since the frame addition has not been carried out, the resulting video can be dark.

Furthermore, if the low-frame-rate video processed by frame addition is selected for display, the selector 21 selects the output after the addition and video based on the selected imaging signal is then displayed on the display 23 (Step S18). At the time of displaying the image captured at a low frame rate, the brightness of the resulting video can be checked, because the video is actually taken at a low frame rate. However, due to a low frame rate, the performance of following up a subject being moved in the video may be insufficient.

As described above, the imaging apparatus according to the embodiment of the invention is capable of obtaining a suitably-gamma-collected image signal by its simple configuration in that gamma correction is carried out after frame addition when an imaging signal is taken at a low frame rate. In other words, the camera processing unit 30 is able to cope with each of normal imaging without frame addition and imaging with frame addition only by changing a gamma curve with an appropriate one to be gamma-corrected, thereby being attained by simple configuration. In particular, in the case of gamma characteristic defined by the SMPTE standard applied in the present embodiment, it can be attained by only changing the amplitude characteristic at the time of correction, thereby responding by a simple configuration.

In addition, the synchronized addition circuit 14 is configured to carry out the addition by processing with a luminance signal and a chroma signal, so that other frame memories for various kinds of image processing in the imaging apparatus can be shared, thereby resulting in a simple configuration as much. In the configuration of the imaging apparatus shown in FIG. 1, the synchronized addition circuit 14 is shared with a frame memory for frame rate conversion, so that the configuration of the imaging apparatus can be simplified as much.

Furthermore, the imaging apparatus is configured so that the selector 21 selects either an imaging signal at a normal frame rate or an imaging signal at a low frame rate to display the image signal as video on the display 23 when imaging is carried out at a low frame rate. Therefore, even when the imaging is carried out at a low frame rate, video being taken at a normal frame rate can be checked. Thus, for example, the focusing state of a focusing lens or the like can be quickly determined. In addition, the brightness of a video compared with the frame addition can be checked simply by displaying the video processed with frame addition.

Furthermore, in the above embodiment, the gamma correction processing for carrying out frame addition and imaging at a low frame rate has been described. Likewise, the correction characteristic of any of other nonlinear correction procedures carried out in the imaging apparatus may be altered at the time of imaging at a low frame rate. For example, the characteristic of knee correction performed in the nonlinear processing unit 32 in the camera processing unit 30 of FIG. 1 may be changed between the case of imaging at a normal frame rate and the case of imaging at a low frame rate.

Furthermore, the example of processing per frame has been explained in the above description. However, the same kind of processing may be carried out per field and similar effects can be obtained.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus, comprising:
an image sensor for converting imaging light obtained through an optical system into an imaging signal;
an imaging signal processing unit for carrying out a nonlinear correction on the imaging signal obtained from the image sensor;
a frame addition unit for adding a predetermined number of frames of the imaging signal processed by the imaging signal processing unit per frame; and
a control unit for appropriately setting each of the correction characteristic of the nonlinear correction in the imaging signal processing unit in the case of carrying out no frame addition in the frame addition unit and the correction characteristic of the nonlinear correction in the imaging signal processing unit depending on the number of added frames in the case of carrying out a frame addition in the frame addition unit,
wherein the imaging signal with the frames added in the frame addition unit or the imaging signal without the frames added in the frame addition unit is selectively output or recorded,
wherein the imaging apparatus is able to perform normal imaging without frame addition and imaging with frame only by changing a gamma curve with an appropriate gamma curve that is gamma-corrected,
wherein gamma correction can be attained by only changing the amplitude characteristic the time of correction.

2. The imaging apparatus according to claim 1, wherein the nonlinear correction is a gamma correction.

3. The imaging apparatus according to claim 2, wherein a gamma curve representing a gamma correction characteristic in the case of carrying out the frame addition is obtained by modifying the amplitude characteristic of the gamma curve representing a gamma correction characteristic in the case of without carrying out the frame addition, depending on the number of added frames.

4. The imaging apparatus according to claim 1, further comprising
a conversion processing unit for dealing with a luminance signal and a chroma signal in the imaging apparatus, wherein
a frame memory included in the frame addition unit is shared with the conversion processing unit.

5. The imaging apparatus according to claim 1, further comprising:
a selection unit for selecting, as an imaging signal to be supplied to a display unit displaying a captured image, the imaging signal output from the imaging signal processing unit or the imaging signal obtained by adding a predetermined number of frames in the frame addition unit.

6. An imaging method comprising the steps of:
carrying out a nonlinear correction on an imaging signal obtained from an image sensor where imaging light is converted into an imaging signal;
adding a predetermined number of frames of the imaging signal with the nonlinear correction per frame;
carrying out control for appropriately setting each of the correction characteristic of the nonlinear correction in the case of carrying out no frame addition and the correction characteristic of the nonlinear correction in the case of carrying out a frame addition; and
selectively outputting either the imaging signal with the frame addition or the imaging signal without the frame addition,
wherein the imaging method is able to perform normal imaging without frame addition and with frame addition only by changing a gamma curve with an appropriate gamma curve that is gamma-corrected,
wherein gamma correction can be attained by only changing the amplitude characteristic at the time of correction.

* * * * *